US012769592B2

(12) United States Patent
Habbanakuppe Surendranath

(10) Patent No.: US 12,769,592 B2
(45) Date of Patent: Oct. 20, 2026

(54) JOB SCHEDULE QUALITY PREDICTION AND JOB SCHEDULING

(71) Applicant: SAP SE, Walldorf (DE)

(72) Inventor: Vinay Habbanakuppe Surendranath, Seeheim-Jugenheim (DE)

(73) Assignee: SAP SE, Walldorf (DE)

( * ) Notice: Subject to any disclaimer, the term of this patent is extended or adjusted under 35 U.S.C. 154(b) by 534 days.

(21) Appl. No.: 18/447,729

(22) Filed: Aug. 10, 2023

(65) Prior Publication Data

US 2024/0160494 A1 May 16, 2024

(30) Foreign Application Priority Data

Nov. 14, 2022 (EP) .................................... 22207301

(51) Int. Cl.
*G06F 3/00* (2006.01)
*G06F 9/50* (2006.01)

(52) U.S. Cl.
CPC .......... *G06F 9/5083* (2013.01); *G06F 9/5044* (2013.01); *G06F 2209/501* (2013.01); *G06F 2209/5019* (2013.01); *G06F 2209/5022* (2013.01); *G06F 2209/503* (2013.01)

(58) Field of Classification Search
CPC ......................................................... G06F 9/48
See application file for complete search history.

(56) References Cited

U.S. PATENT DOCUMENTS

| | | | | |
|---|---|---|---|---|
| 8,850,073 | B1 * | 9/2014 | Wilkes | G06F 11/2066 709/248 |
| 9,613,046 | B1 * | 4/2017 | Xu | G06F 11/1464 |
| 10,748,072 | B1 * | 8/2020 | Seeger | G06N 20/00 |
| 10,824,959 | B1 * | 11/2020 | Chatterjee | G06N 5/025 |
| 11,347,544 | B1 * | 5/2022 | Spivak | G06F 9/505 |
| 11,656,932 | B2 * | 5/2023 | Mahamuni | G06F 11/3409 714/48 |
| 12,056,524 | B2 * | 8/2024 | Xu | G06F 9/485 |
| 2012/0109887 | A1 * | 5/2012 | Ziemann | G06F 16/27 707/610 |
| 2019/0149619 | A1 * | 5/2019 | Lisac | G06F 16/24552 709/203 |
| 2019/0347125 | A1 * | 11/2019 | Sankaran | G06F 9/30036 |
| 2020/0117504 | A1 * | 4/2020 | Bahl | G06F 9/5038 |

(Continued)

FOREIGN PATENT DOCUMENTS

CN 111930485 A 11/2020

OTHER PUBLICATIONS

Sam McCandlish, An Empirical Model of Large-Batch Training. (Year: 2018).*

(Continued)

*Primary Examiner* — Lechi Truong
(74) *Attorney, Agent, or Firm* — Buckley, Maschoff & Talwalkar LLC

(57) ABSTRACT

Some embodiments are directed to scheduling batch jobs for execution on a computer system. Multiple candidate job schedules may be generated that satisfy the defined limits. A job schedule quality may be predicted for the candidate job schedules using a predictive model previously trained on job schedule performance data. The candidate job schedule with suitable job schedule quality is used for autonomously scheduling the batch job execution.

24 Claims, 6 Drawing Sheets

(56) References Cited

U.S. PATENT DOCUMENTS

| | | | | |
|---|---|---|---|---|
| 2021/0192412 | A1* | 6/2021 | Krishnaswamy | G06Q 10/06316 |
| 2023/0161620 | A1* | 5/2023 | Lu | G06F 9/4881 718/104 |

OTHER PUBLICATIONS

Neeraja J. Yadwadkar, Multi-Task Learning for Straggler Avoiding Predictive Job Scheduling. (Year: 2016).*

Islam, Tariqul et al., "FaCS: Toward a Fault-Tolerant Cloud Scheduler Leveraging Long Short-Term Memory Network", 2019, 6th IEEE International Conference on Cyber Security and Cloud Computing (CSCloud)/2019 5th IEEE International Conference on Edge Computing and Scalable Cloud (EdgeCom), Jun. 21, 2019 (Jun. 21, 2019), XP33623517, DOI: 10.1109/CSCloud/EdgeCom.2019.00010, (pp. 1-6, 6 total pages), [retrieved on Sep. 30, 2019].

Garg, Saurabh Kumar et al., "SLA-based virtual machine management for heterogeneous workloads in a cloud datacenter", Journal of Network and Computer Applications, vol. 45, Aug. 1, 2014 (Aug. 1, 2014) XP55492919, ISSN: 1084-8045, DOI: 10.1016/j.jnca.2014.07.030, (pp. 108-120, 13 total pages).

"Communication—European Extended Search Report", European Patent Office, Jun. 7, 2023 (Jun. 7, 2023), for European Application No. 22207301.7-1203, 15pgs.

* cited by examiner

JOB SCHEDULE QUALITY PREDICTION AND JOB SCHEDULING

CROSS-REFERENCE TO RELATED APPLICATIONS

This application claims priority to and the benefit of EP Application 22207301.7, filed 14 Nov. 2022, the contents of which are incorporated by reference herein for all purposes.

TECHNICAL FIELD

The presently disclosed subject matter relates to a method for scheduling batch jobs on a computer system, a method for training a predictive model, a system for scheduling batch jobs on a computer system, a system for training a predictive model, a computer readable medium.

BACKGROUND

Enterprise software solutions often run repetitive tasks on large volumes of data using a batch processing technique. Batch processing is time-consuming and resource intensive, e.g., consuming CPU and/or IO resources. Batch processing is therefore often executed in the background to avoid disrupting end users that are interacting with software, e.g., using UI features.

Typical examples of batch jobs include data synchronization with external systems, bulk processing of documents including printing, workflow automations, periodic calculations, and aggregations.

Historically, the batch jobs have been handled using a scheduler-driven approach. For example, in a scheduler-driven approach a timer triggers the execution of a job based on predefined schedule. A schedule defines the point in time for execution and frequency.

Scheduling of batch jobs is becoming increasingly more difficult. For example, the higher the data volume and complexity of the batch job, the longer the running time of job and higher the resource consumption. Accordingly, it becomes ever more important to schedule these jobs carefully, so as not to waste computing resources, e.g., by obtaining unneeded computer hardware upgrades, and/or not to impact users running interactive software.

Furthermore, cloud computing further complicates scheduling. Consider, in an on-premise environment, the user commissions the infrastructure, software and controls all the system resources. The user may continuously monitor the systems to balance the growing demands of end users vis-a-vis increasing workload of batch jobs. If required, the user has the needed data to upgrade his system resources to keep up with growing demand and to reduce disruptions to end users of interactive software.

However, if the batch jobs are run in a cloud environment this is different. When software is delivered online, e.g., as software as a service (SaaS), e.g., as a business network, or a cloud application, then infrastructure and system resources are controlled by a service provider. The service is typically used by multiple clients, sometimes referred to as tenants. The tenants share the same computer hardware. Neither the clients, nor the software provider has a complete picture of the batch jobs running at the service. Even if a user were to try to optimize the running of his/her batch jobs, such optimization is likely not very successful, as other tenants' use of the system will impact system utilization.

As none of the clients, nor the service provider have end-to-end visibility of resource consumption or control over workload handling, there is a need to improve scheduling of batch jobs.

SUMMARY

Batch job processing, e.g., background processing, plays a key role in maintaining good system performance and availability. Determining the schedule of the background jobs in a system landscape has to take into account of resource availability, average number of users, on/off peak hours, volumes of batch job, and so on. The schedule has to be designed in such a way that the entire set of batch jobs is completed, say, in a span of 24 hours. The performance of the system depends on the state of batch processes in the system and memory and CPU resources consumed by them.

It would be advantageous to have an improved scheduling of batch jobs. In an embodiment, a job schedule quality is predicted for multiple candidate job schedules using a predictive model previously trained on job schedule performance data. From the generated candidate job schedules a job schedule is selected, in particular, selected in dependence on the predicted job schedule quality. In this way, a suitably performing schedule can be chosen. For example, a number of candidate job schedules may be generated, and the best one may be selected.

For example, the predictive quality may comprise a predicted load for an involved system resource of the computer system, induced by the candidate job schedule, and/or a predicted availability of a system involved in the processing of the candidate job schedule.

An advantageous approach to job scheduling is to use a predictive model, e.g., a machine learned model, to predict the resources that will be consumed by each one of the multiple batch jobs, e.g., an individual induced load, duration, network bandwidth and so on. Once this prediction is made, a combinatorial search algorithm can be used to create the schedule, taking into account batch parameters that define how often and/or when a batch job is to execute. The job schedule quality can be computed by adding individual loads for a particular time induced by batch jobs scheduled to run at the particular time, and comparing it to available load, e.g., load not consumed by interactive applications, e.g., users using the system.

In this way, the problem of predicting load is split from the problem of creating a job schedule. This is advantageous as the predictive models perform well at this task.

In an embodiment, jobs are scheduled for execution on a server, e.g., a SaaS server, Cloud server, or the like. For example, the computer system for which jobs are scheduled is a Software as a Service (SaaS), or Cloud system; client systems interact with the computer system to register one or more batch jobs. The scheduling comprising determining a suitable schedule to execute the registered jobs based on job schedule quality, the multiple batch jobs sharing the computer hardware A further aspect is a scheduling method. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 a schematically shows an example of an embodiment of a scheduling system, FIG. 1*b* schematically shows an example of an embodiment of a client system, FIG. 1*c* schematically shows an example of an embodiment of an executing system, FIG. 1*d* schematically shows an example of an embodiment of a computing system, FIG. 1*e* schematically shows an example of an embodiment of a computing system, FIG. 2 schematically shows an example of an embodiment of a computing system, FIG. 3 schematically shows an example of an embodiment of a scheduling system, FIG. 4*a* schematically shows an example of an embodiment of batch job registrations, FIG. 4*b* schematically shows an example of an embodiment of multiple batch job schedules, FIG. 5*a* schematically shows an example of an embodiment of a user load prediction, FIG. 5*b* schematically shows an example of an embodiment of an available load prediction, FIG. 5*c* schematically shows an example of an embodiment of a load prediction, FIG. 5*d* schematically shows an example of an embodiment of a batch job schedule, FIG. 6 schematically shows an example of an embodiment of a method for scheduling batch jobs on a computer system, FIG. 7*a* schematically shows a computer readable medium having a writable part comprising a computer program according to an embodiment, FIG. 7*b* schematically shows a representation of a processor system according to an embodiment.

DESCRIPTION OF EMBODIMENTS

Figure 1A:
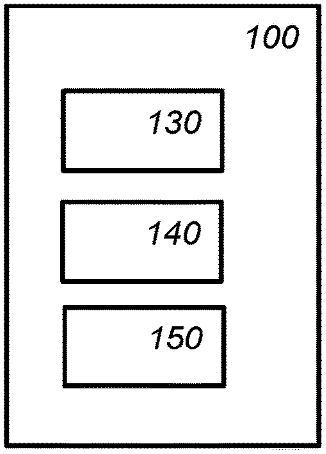

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Figure 1B:
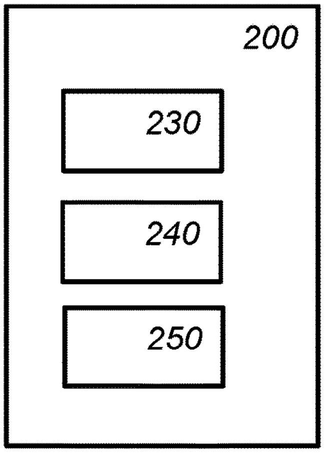
Figure 1C:
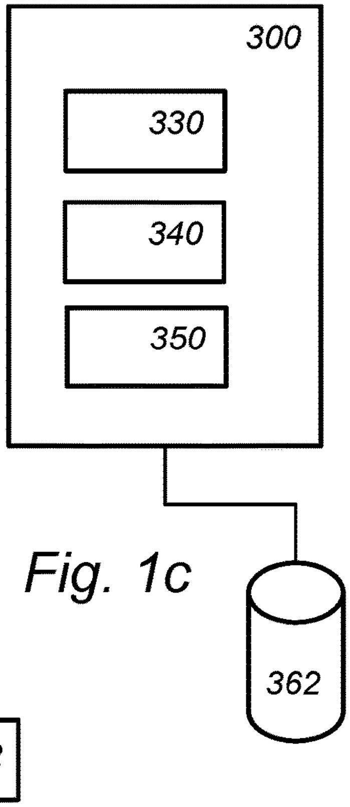
Figure 1D:
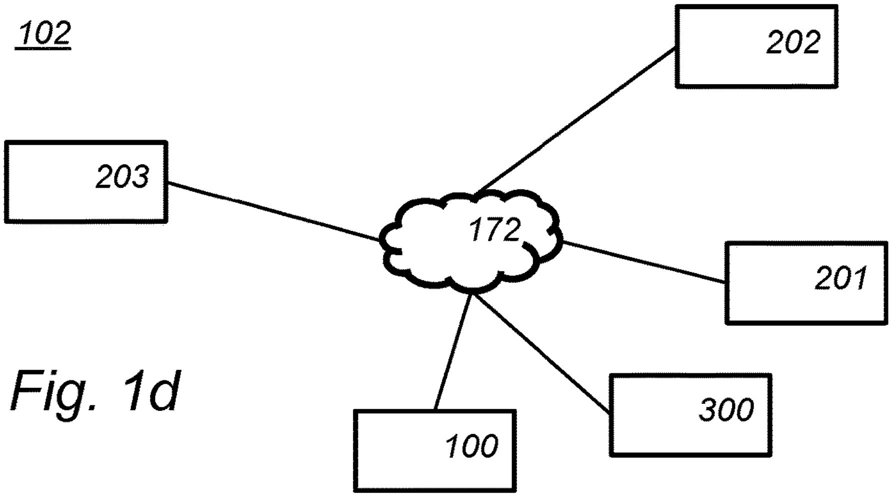
Figure 1E:
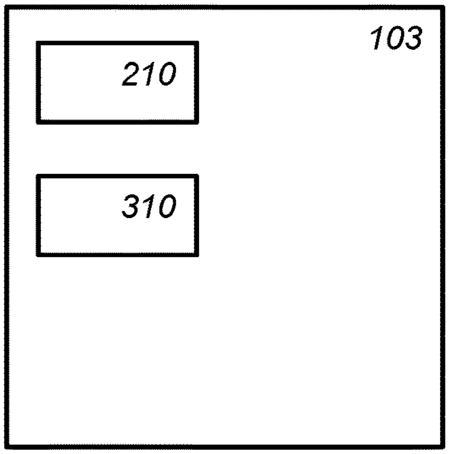

FIG. 1*a* schematically shows an example of an embodiment of a scheduling system 100. FIG. 1*b* schematically shows an example of an embodiment of a client system 200. FIG. 1*c* schematically shows an example of an embodiment of an executing system 300.

Scheduling system 100, client system 200 and executing system 300 may be part of a computing system, e.g., system 102 or 103.

Client system 200 may be a remote client, e.g., remote from scheduling system 200 and remote from executing system 300. Client system 200 may be a device, but may also be a client network of devices. Client system 200 is configured to register at scheduling system 200 one or more batch job registrations. The batch job registration defining a batch job for execution on executing system 300. In this example, the client system, scheduling system, and execution system are distinct systems, but any two could be combined. For example, scheduling and execution can be combined. Also all three could be combined into a single system.

Scheduling system 100 is a computer system for scheduling batch jobs. Scheduling system 100 is configured to receive multiple batch job registrations from one or more client systems. A batch job typically defines the particular code to run and data to run the code on, but may also comprise various scheduling parameters, e.g., period for which job schedules have to be computed, guarantees on running the code, etc. Scheduling system 100 is configured to compute a job schedule for executing the multiple batch jobs. The job schedule may be used by executing system 300 for running the registered batch jobs.

Executing system 300 is configured to execute the batch jobs on computer hardware. Executing system 300 may have access to one or more databases. Shown is database 362. One or more batch jobs may access a database, and add or modify or delete records therefrom.

For example, the system 102 may be used to process data obtained from multiple client system, on shared computer resources. For example, the system 102 may be used to process data obtained from multiple client system on a single database.

Scheduling system 100 may comprise a processor system 130, a storage 140, and a communication interface 150. Client system 200 may comprise a processor system 230, a storage 240, and a communication interface 250. Executing system 300 may comprise a processor system 330, a storage 340, and a communication interface 350.

In the various embodiments of communication interfaces 150, 250 and/or 350, the communication interfaces may be selected from various alternatives. For example, the interface may be a network interface to a local or wide area network, e.g., the Internet, a storage interface to an internal or external data storage, an application interface (API), etc.

Storage 140, 240 and 340 may be, e.g., electronic storage, magnetic storage, etc. The storage may comprise local storage, e.g., a local hard drive or electronic memory. Storage 140, 240 and 340 may comprise non-local storage, e.g., cloud storage. In the latter case, storage 140, 240 and 340 may comprise a storage interface to the non-local storage. Storage may comprise multiple discrete sub-storages together making up storage 140, 240, 340. Storage may comprise a volatile writable part, say a RAM, a non-volatile writable part, e.g., Flash, a non-volatile non-writable part, e.g., ROM.

Storage 140, 240 and 340 may be non-transitory storage. For example, storage 140, 240 and 340 may store data in the presence of power such as a volatile memory device, e.g., a Random Access Memory (RAM). For example, storage 140, 240 and 340 may store data in the presence of power as well as outside the presence of power such as a non-volatile memory device, e.g., Flash memory.

Executing system 300 may have access to a database 362. Database 362 may comprise multiple records. Database 362 may be shared among multiple client systems. Database 362 may be configured for keep data from multiple clients, e.g., tenant, separated. Database 362 may comprise of multiple discrete databases that are shared across or separated by tenants.

The devices 100, 200 and 300 may communicate internally, with each other, with other devices, external storage, input devices, output devices, and/or one or more sensors over a computer network. The computer network may be an internet, an intranet, a LAN, a WLAN, etc. The computer network may be the Internet. The devices 100, 200 and 300 comprise a connection interface which is arranged to communicate within system 102 or outside of system 102 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interface 150 may be used to send or receive digital data, e.g., batch job registrations, batch job schedules, training data. The communication interface 250 may be used to send or receive digital data, e.g., batch job registrations, batch job execution inputs, batch job execution outputs. The communication interface 350 may be used to send or receive digital data, e.g., batch job schedules, batch job execution inputs, batch job execution outputs.

The execution of devices 100, 200 and 300 may be implemented in a processor system. The devices 100, 200 and 300 may comprise functional units to implement aspects of embodiments. The functional units may be part of the processor system. For example, functional units shown herein may be wholly or partially implemented in computer instructions that are stored in a storage of the device and executable by the processor system.

The processor system may comprise one or more processor circuits, e.g., microprocessors, CPUs, GPUs, etc. Devices 100, 200 and 300 may comprise multiple processors. A processor circuit may be implemented in a distributed fashion, e.g., as multiple sub-processor circuits. For example, devices 100, 200 and 300 may use cloud computing.

In an embodiment, jobs are scheduled for execution on a server, e.g., a SaaS server, Cloud server, or the like. The computer(s), e.g., computer system, on which jobs are executed may be external to the computer of a client, e.g., a computer used to register batch jobs for execution. The scheduling may execute on the same computer system on which the job execute, or may be a different computer, e.g., computer system.

For example, the computer system for which jobs are scheduled is a Software as a Service (SaaS) system, or Cloud system; client systems interact with the computer system to register one or more batch jobs. The scheduling comprising determining a suitable schedule to execute the registered jobs based on job schedule quality, the multiple batch jobs sharing the computer hardware Typically, the scheduling system 100, client system 200 and executing system 300 each comprise a microprocessor which executes appropriate software stored at the device; for example, that software may have been downloaded and/or stored in a corresponding memory, e.g., a volatile memory such as RAM or a non-volatile memory such as Flash.

Anyone of scheduling system 100, client system 200 and executing system 300 may be implemented as a cluster of computer.

Instead of using software to implement a function, the devices 100, 200 and/or 300 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, scheduling system 100, client system 200 and executing system 300 may comprise circuits, e.g., for cryptographic processing, and/or arithmetic processing.

In hybrid embodiments, functional units are implemented partially in hardware, e.g., as coprocessors, e.g., neural network coprocessors, and partially in software stored and executed on the device.

There are various ways to embody the various systems. For example, a scheduling system may be integrated in a client system; For example, integrated with a client's on-premise system. For example, a scheduling system may be offered as a software as a service (SaaS) application, e.g., provided online, e.g., in the cloud. The scheduling functionality may be included directly in a library, e.g., a software as a service library, etc.

FIG. **1*d* schematically shows an example of an embodiment of system 102. System 102 may comprise multiple client devices; shown are client systems 201, 202 and 203. System 102 may comprise multiple executing systems; shown is executing system 300**.

The systems are connected through a computer network 172, e.g., the Internet. The client and client system may be according to an embodiment.

FIG. **1*e* schematically shows an example of an embodiment of system 103. System 103 may comprise multiple client systems; shown is client systems 210. System 103 may comprise multiple executing systems; shown is executing system 310. In system 103, the client systems and executing systems are sub-systems of the same computing system 103. For example, system 103 may be a server device, e.g., a cloud server. System 103 may run a scheduling task to implement the scheduling system. System 103 may run one or more client tasks to implement the one or more client systems. System 103** may run one or more executing tasks to implement the one or more batch jobs. The systems are internal and connected, e.g., through an internal system-wide communication, e.g., a bus.

Figure 2:
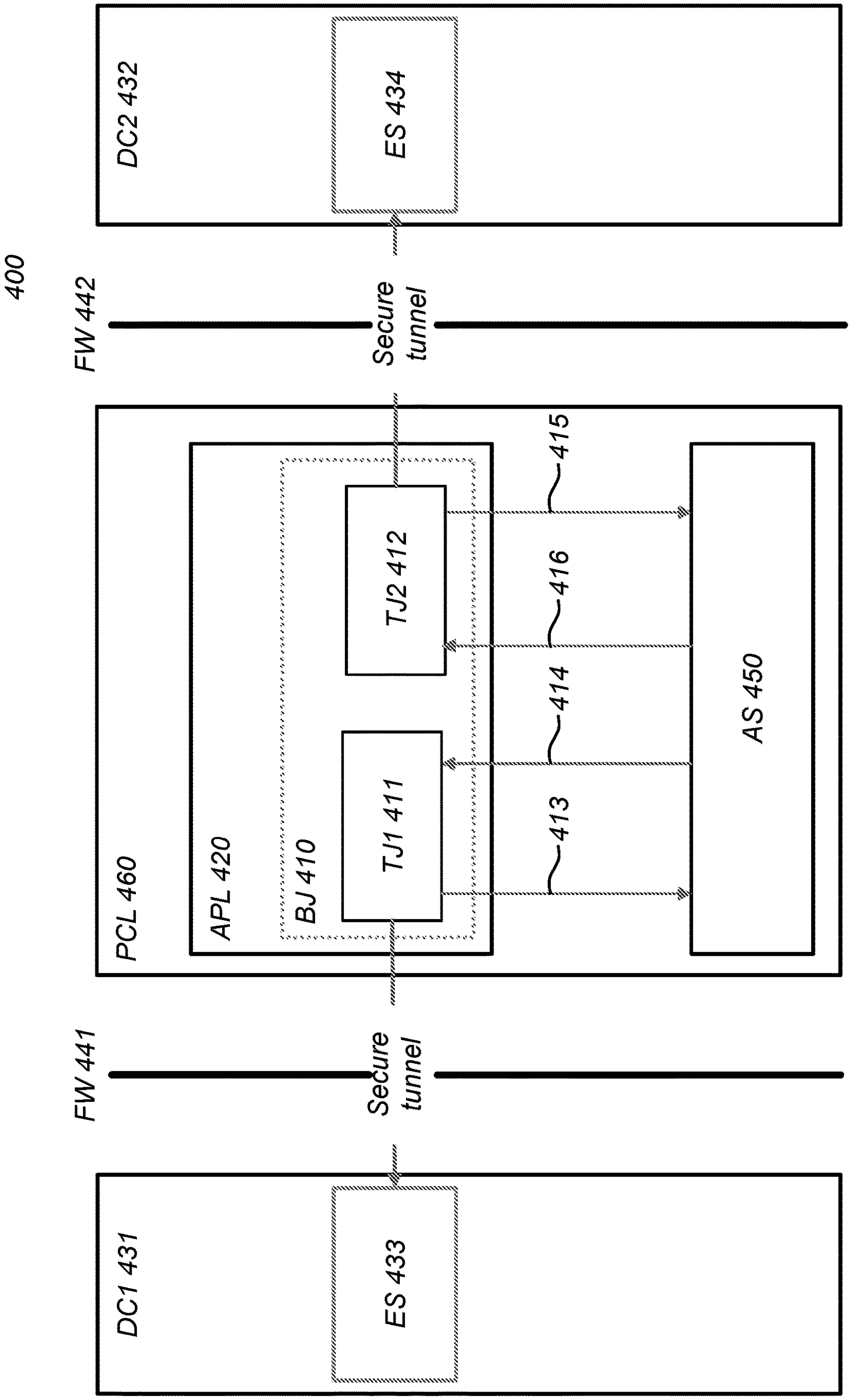

FIG. 2 schematically shows an example of an embodiment of a computing system 400.

Computing system 400 comprises a provider cloud environment 460, PCL, e.g., implemented as a server or one or a cluster of one or more computers. Cloud environment 460 may be used by multiple clients. Shown in FIG. 2, is a first client datacenter, 431, DC1, and a second client datacenter 432, DC2. There may be many more than two client datacenters. For example, the client datacenters may connect to cloud environment 460 through a secure tunnel, which allows the clients to tunnel through a fire wall. FIG. 2 shows a first firewall 441, FW1 and a second firewall 442, FW2; technically this may be the same firewall, each of the client having credentials to allow secure tunneling, so as to reach cloud environment 460. For example, the firewall(s) may be implemented by a security system.

Running on the client datacenters is software that registers batch jobs for running with the cloud environment 460. For example, the first datacenter may run an enterprise system X 433, ES, while the second datacenter may run an enterprise system Y 434, ES.

Running on cloud environment 460 may be a SaaS Application 420, APL. Application 420 may be configured to run multiple batch jobs 410, BJ. For example, enterprise system 433 may register tenant1 jobs 411, TJ1 for executing at cloud environment 460, while enterprise system 434 may register tenant2 jobs 412, TJ2 for executing at cloud environment 460. Note that batch jobs of different clients or tenants, typically are separated from each other; in fact, the presence of other tenants on the system is often transparent, e.g., not visible to user level software.

Alternatively, application APL 420 may register batch jobs for running within the cloud environment 460 and connecting to enterprise system 433 ES in a client datacenter as a remote system providing data during the job execution. For example, in case of data synchronization jobs, the execution logic may be focused on reading, filtering, transforming, and loading the large volumes of data from remote system in client data center into the application on the cloud.

Cloud environment 460 comprises a scheduler 450, AS, sometimes referred to as the autonomous scheduler or autonomous job scheduler, to indicate that the scheduler 450 supersedes the level of the individual users. User level software may register a batch job with scheduler 450. For example, FIG. 2 shows Registration of batch jobs 413, 415 for the two shown tenants. Note that the tenants are oblivious to the registrations of the other user. The autonomous scheduler 450 however has knowledge of batch jobs registered by multiple users. Scheduler 450 responds with scheduling information; for the first client, scheduling information 414, for the second client, scheduling information 416.

In this embodiment, scheduling information is provided to the client software running on the cloud environment. The client's may or may not follow the scheduling information, though it would be to their advantage to follow it, as diverting to would likely make the scheduling less optimal to the detriment of all user of the cloud environment. In this or other embodiments, scheduling could be made mandatory instead. For example, after registering a batch job with scheduler 450, scheduler could forward the batch job to execution software for execution of the batch jobs according to a schedule.

In this embodiment, the scheduling software runs in the same cloud system that will also execute the batch jobs. Scheduler, tenant software, and/or batch job executing software may communicate, e.g., using, APIs, e.g., or inter-process communication. Running the scheduling software in the same system as the batch job execution is not necessary though, for example, the scheduler could be located in a remote environment or in another cloud system in the same environment. For example, the scheduler could communicate with the tenant software, batch job executing software, and the like, through intra-process communication.

The scheduler 450 is an artificial intelligent (AI) agent that learns about the behavior of involved systems and its resources while executing batch jobs, analyzes them against various dimension including time, and then uses the insights to determine improved schedule for future runs of the batch jobs. The involved systems and its resources may be located across service provider and client environments.

For example, scheduler 450 may generate multiple candidate job schedules, and predict a job schedule quality for candidate job schedule using a predictive model previously trained on job schedule performance data. From the multiple candidate job schedules, a job schedule may be selected. There may be various criteria to do this. Selecting the job schedule may depend on the predicted job schedule quality, e.g., the best predicted job schedule quality.

For example, a scheduler could try to plan batch jobs in time windows when the involved systems/resources are most available, e.g., when they are up and reachable, and least occupied. Furthermore, the time window should be large enough to execute a given batch job, preferably with minimal disruptions.

Other considerations can be taken into account. For example, in case of data synchronization jobs, the probability of existence of delta data, e.g., changes in data, in remote system at a given time can be factored into the goal.

Various batch job parameters may be specified, typically, when registering a batch job. A batch job parameter defines limits on the scheduling of the corresponding batch job. A batch job parameters enables a client to influence or control the behavior of the scheduler.

Some exemplifying parameters are provided for illustration. Not all of these parameters may be supported by an embodiment, or further parameters may be embodied

- Time Horizon: Defines the start and end time range between which schedules have to be generated for the job
- Execution Guarantee: The client can specify constraints like "at least once per T", "at most once per T", . . . etc. to instruct the Planner. T may be a time period, e.g., a day, a week, an hour, or more, or less.

Various metrics are collected concerning the batch job execution. Metric collection could be restricted to a training period, or the like, but preferably, metrics are continuously collected, as it allows improving the scheduler's predictive model. Performance, availability, and/or other relevant data gathered on involved systems and resources while the jobs are being executed or from the system snapshot Some possible metrics for illustration

- Data Transmission Rate
- Data Load per Job Run
- CPU, System Memory, and Network Stats
- Local Processing Throughput
- End-to-end Throughput
- Job Input Change Rate by Time
- Availability/Error Rate by Time Scheduler 450 may retry a failed job run at a point in time when system has higher availability and lower error rates, instead of mechanically retrying with a delay as in conventional schedulers. For example, an embodiment may be configured for detecting a failed batch job execution, and rescheduling the batch job at a point in time with improved predicted availability and/or error rates compared to a threshold.

Scheduler 450 is configured with a predictive model configured to predict the quality, e.g., performance of a candidate schedule using the predictive model. The predictive model is previously trained on job schedule performance data. For example, the predictive model could use a statistical technique, or artificial intelligence/machine learning algorithm.

A scheduler according to an embodiment may have advantages over a regular scheduler. For example, scheduler 450 may free up the service provider and/or client from worrying about the right schedule and frequency for the batch job, as this is determined through machine learning. Scheduler 450 may automatically schedule a job when the involved systems/resources are most available, but least occupied and/or when there is high probability of input for the job. Thus, conserving resources and reducing disruptions to end user experience of all involved systems.

Figure 3:
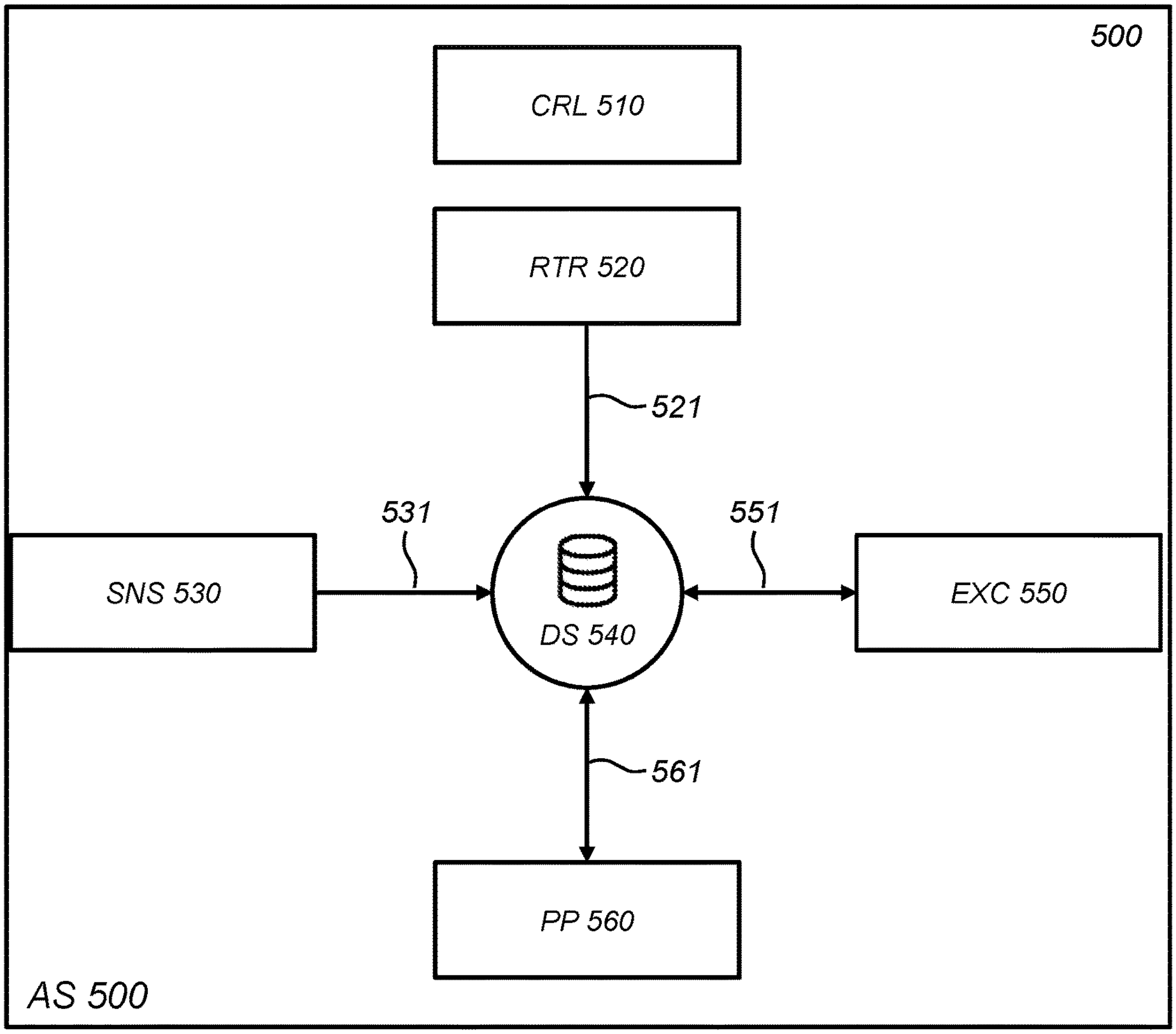

FIG. 3 schematically shows an example of an embodiment of a computing system 500 provided with a scheduler according to an embodiment.

Shown in FIG. 3 is an optional controller 510, CRL. Controller 510 monitors the health and operation of the components of computing system 500 and steers them to deliver on service quality. Controller 510 is often used in large scale distributed set-up, but is not necessary.

Computing system 500 comprises a sensing system 530, SNS. Sensing system 530 continuously gathers performance and availability data on involved systems and resources while the jobs are being executed, sometimes referred to as execution metrics.

Computing system 500 comprises a registrar 520, RTR configured to register batch jobs with schedule parameters like time horizon and execution guarantees, from a consuming application or service. For example, an execution guarantee may indicate a minimal and/or maximum number of executions for a time period.

Computing system 500 comprises a predictive planner 560, PP that determines for batch jobs, an execution schedule adhering to the schedule parameters and based on historical execution metrics. The planner (or scheduler) comprises a predictive model that predicts how well a schedule is likely to work out. The predictive planner may be implemented using various Machine Learning and/or AI techniques Computing system 500 comprises an executor 550, EXC configured to execute the jobs based on the schedule(s) determined by planner 560.

Computing system 500 comprises a datastore 540, DS. Datastore 540 enables reliable and persistent access to batch registration, planning/scheduling and execution metric data between the components of the system, namely RTR, SNS, PP, EXC & CRL.

Sensing system 530 may store execution metrics 531 in datastore 540. Registrar 520 may store batch jobs and schedule parameters 521 in datastore 540. The planner 560 may obtain and/or store jobs, parameters, metrics, optimized schedules 561 in datastore 540. Executor 550 may retrieve a schedule 551 from the datastore and store the execution metrics gathered during job schedule execution. Instead of going through a datastore many of these data flows could go direct as well; for example, the schedule could go directly from planner to executor. However, going through the data store allows asynchronous operation. Arrow 551 is bidirectional to indicate that the executor may collect and store execution metrics in the data store all the time, e.g., to enable continuous training of predictive model and better planning.

Execution metrics may contain various information. In an embodiment, execution metrics for example may include, but not limited to:

Job identifier: identifying the batch job. Note that as batch job frequently repeat, knowing the identity of the batch job give information on the likely load.

Processed At: date and time the batch job was executed

Preprocessing Duration: time preprocessing for the batch job took.

Processing Duration: time the batch job took in executing

Postprocessing Duration: time the postprocessing for the batch job took,

Load: the load induced by the batch job during processing.

Throughput: effective rate at which the job was executed during the schedule

Figure 4A:
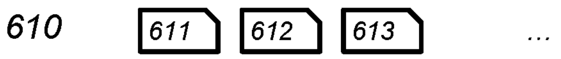

FIG. 4*a* schematically shows an example of an embodiment of a batch job registrations. Shown are multiple registrations 610. Of the multiple there are shown in FIG. 4*a* registrations 611, 612 and 613. A registration contains the information needed to schedule the job. For example, registration 611 may comprise the information needed, to schedule particular batch job; possibly multiple time, e.g., one or more times in a given time period. For example, a user provides one or more batch jobs and associated parameters and the scheduler calculates an appropriate schedule for repeated execution in line with the (optional) requested execution guarantees.

Typically, in scheduler the batch jobs are registered independent of each other. It is also possible to schedule an overarching batch job, e.g., a parent batch job, possibly with corresponding scheduling information. The overarching batch job may then comprise multiple constituent subtasks that are scheduled by the scheduler. The parent batch job's scheduling information may be used for the scheduling of the subtasks, but the subtasks may have additional scheduling information that extends or overrides the parent's scheduling parameters.

Interestingly, a user does not need to specify in what time period(s) a batch job has to run, but may instead provide, e.g., frequency of job execution, time horizon, and/or execution guarantees.

A registration will also contain the information needed by the executor to execute the job. For example, the identity of the batch job, e.g., an executable name, or service or the like. Possibly the registration will also contain parameters that are to be passed to a batch job for a particular run, the location of the executable code and/or access information.

Figure 4B:
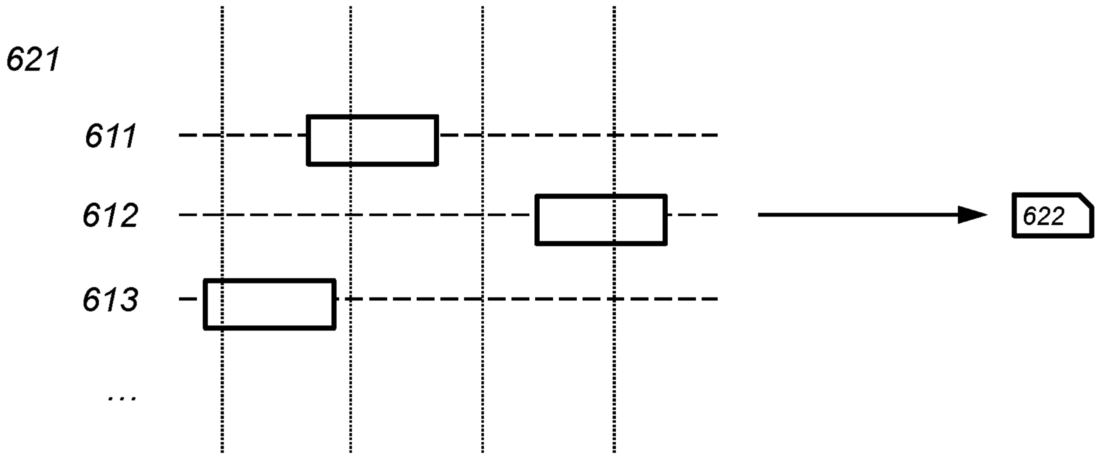
Figure 4B:
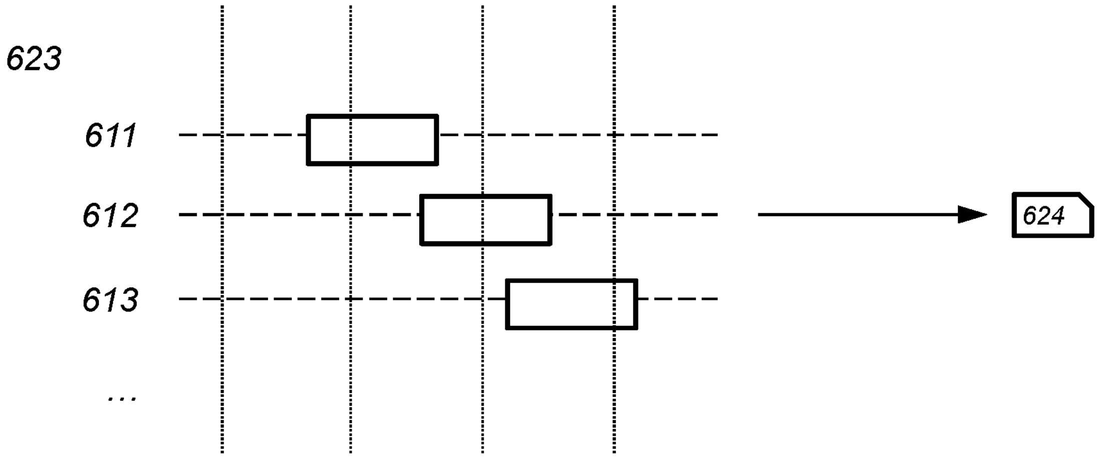

FIG. 4*b* schematically shows an example of an embodiment of multiple batch job schedules. A scheduler may be configured to generate multiple candidate job schedules. Shown in FIG. 4*b* are two such schedules. On the horizontal axis is time, on the vertical axis the batch jobs are indicated. A planned execution time period is indicated by white boxes.

The job schedule satisfies batch job parameters. For example, batch job 611 might be restricted in that it cannot be started too early. Creating a job schedule that satisfies parameters is known in the art. For example, techniques from constraint programming such as backtracking search, local search, dynamic programming. However, satisfying the constraints does not imply that the schedule is a good schedule. Accordingly, a job schedule quality 622 is predicted for candidate job schedule 621 using a predictive model previously trained on job schedule performance data.

Next the scheduler generates a next candidate job schedule: candidate job schedule 623. Candidate job schedule 623 also satisfies the constraints but can otherwise be quite different. A job schedule quality 624 is predicted for candidate job schedule 623 using the predictive model.

By taking the candidate job schedule with the best job schedule quality an improved job schedule is obtained.

For example, in an embodiment multiple candidate job schedules are generated, and a job schedule quality is predicted for each of them. A job schedule may then be selected from the multiple candidate job schedules according to the predicted job schedule qualities. For example, generation may stop once a suitable quality is found. For example, a fixed number of candidates may be generated, and the best quality may be selected.

The multiple jobs, or at least one or more of them, may then be executed according to the selected candidate job schedule.

Job schedule quality may, e.g., express how much the schedule is likely to incommodate interactive application that also run on the system. For example, the job schedule quality may predict delay time in interactive application. Delay time for a user for example. Job schedule quality may, e.g., express other aspects of system performance, e.g., swap rate.

Job schedule quality may comprise a predicted load. Predicted load may be an overall, e.g., average load, but may also be specific for client system, an integrated external system, or the computer network.

Job schedule quality may comprise a predicted availability of a system involved in the processing of the candidate job schedule.

Job schedule quality can be obtained as a function of the complete job schedule, e.g., for the next 24 hours. An advantageous approach to job schedule quality is to predict load of individual batch jobs, and use the predicted load to fit the batch jobs under a curve of available load. Job schedule quality can then be taken as how well this can be done, e.g., how close to the curve the batch job get.

Figure 5A:
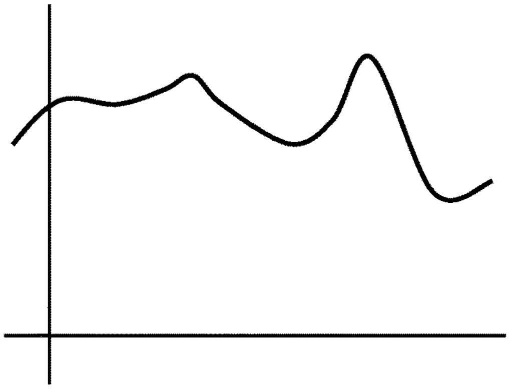

FIG. 5*a* schematically shows an example of an embodiment of a user load prediction. Shown in FIG. 5*a* is the load induced by interactive, e.g., non-batch, applications. At some times of the day, this load will be higher than on others. The curve can be obtained by recording execution metrics during a training period. In an embodiment, interactive load may be average per time period, to obtain an average load curve. More advanced embodiments can use its own predictive model to predict load induced by interactive application for various times of the day.

Figure 5B:
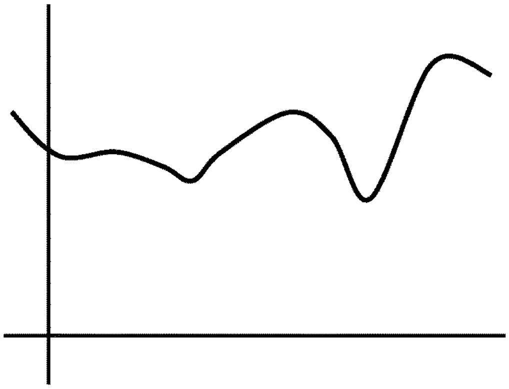

FIG. 5*b* schematically shows an example of an embodiment of an available load prediction. The curve of FIG. 5*b* is derived from that of FIG. 5*a*. By subtracting the expected load of interactive application from a fixed load, e.g., from 100%, a curve is obtained that indicated the room available for batch job applications. For example, job schedule quality may comprise adding individual loads for a particular time induced by batch jobs scheduled to run at the particular time. The job schedule quality may then indicate the likelihood that the added load will exceed available load.

Figure 5C:
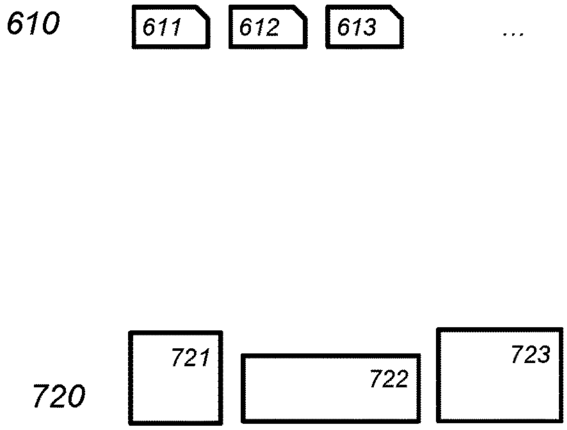

FIG. 5*c* schematically shows an example of an embodiment of a load prediction for multiple batch jobs 610. A predictive model is used to predict the load the batch jobs. Shown are multiple prediction 720. The prediction is visualized as a box, wherein, in this case, load is expressed on the vertical axis, and duration on the horizontal axis.

Interestingly, predicting load and duration can be done fairly well for batch jobs because of their repetitive nature. Interestingly, the predictive model can be simplified considerably by configuring the predictive model to classify batch jobs into one of multiple categories with a different expected load. For example, only a few, say, less than 10, different load and/or duration possibilities are allowed for the output of the load predictor.

Figure 5D:
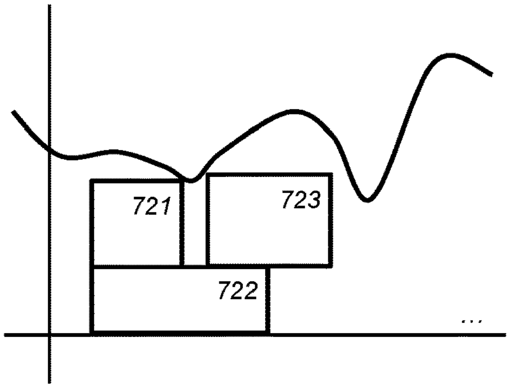

FIG. 5*d* schematically shows an example of an embodiment of a batch job schedule. The predictive model may first predict an individual induced load for the multiple batch jobs. For example, given the multiple batch jobs 610, multiple load predications 720 may be made. A job scheduler can now approximate the job schedule. For example, the batch jobs may be arranged so that they stay under the curve, and satisfy the batch job parameters. The example, shown in FIG. 5*d*, was obtained by applying a greedy algorithm. After, first fitting batch job 721, it turns out that the next batch job 722 still can be started at the same time, while staying under the curve. The next batch job 723, has too high a load to fit, at the same time. The job is scheduled in at the first opportunity. Note that the quality of this job may not be very high as the stacked job nearly touch the available load curve.

In an embodiment, a predictive model predict load and duration for multiple batch jobs, the multiple batch jobs are then arranged in an initial schedule, the initial schedule is repeatedly perturbed to improve satisfying batch job parameters, and improve schedule quality. Various perturbation methods exist, to explore the state space, e.g., tabu search, local search, simulated annealing, and so on. Interestingly, this approach splits the problem of creating a schedule, by applying predictive techniques to prediction of properties of the individual batch jobs, e.g., their load and/or duration(s), while the creation of the schedule is done using combinatorial techniques. If desired a second predictive model could be used to predict the overall quality, but this is not necessary. Interestingly, in this approach it is not needed for machine learned models to learn combinatorial optimization, something which machine learned models do not excel at.

Other aspect can also be predicted and taken into account. For example, an important class of batch jobs, are data synchronization jobs across multiple client systems. Such jobs may have more or less work to do, depending on the amount of changes that took place. Accordingly, an embodiment comprises predicting the likelihood of a change in the client system at a given time, the quality of a job schedule reducing for the data synchronization jobs scheduled with lower likelihood of change. The same approach can be taken for other batch jobs. For example, jobs that work on local system just processing business logic and/or changing status of business objects.

The various predictive models used in embodiments, e.g., to predict a job schedule quality or to predict load and/or duration of a batch job may be obtained by machine learning.

For example, during a training period, a conventional scheduler may be used, e.g., one that only takes batch job parameters into account. During the training period, performance data is collected. The metrics data is used to train a suitable predictive model. The model may be continuous trained with the arrival of new metrics data over time. Suitable models include neural network, support vector machines and the like.

An interesting trick was found to improve upon the training data. Often batch job registrations will have a parameter defining a minimum number of executions of the batch job for a set time period. For example, the batch job should be executed at least once every 24 hours. This leaves the system some freedom, in scheduling the batch job sooner than 24 hours after it first executed. However, this freedom can be exploited by having the batch job run more often that once per 24 hours, say 4 times per 24 hours. As a result the amount of training data increases, and the training period can be shortened.

Figure 6:
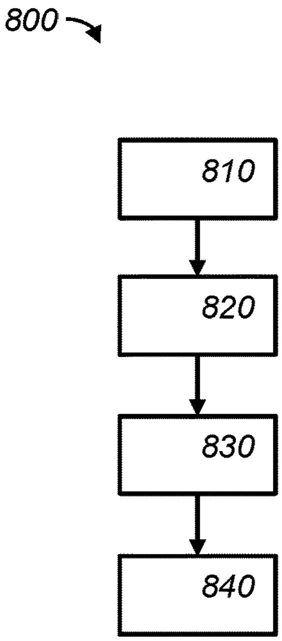

FIG. 6 schematically shows an example of an embodiment of a method 800 for scheduling batch jobs on a computer system. The method comprises

- receiving (810) multiple batch job registrations from multiple client systems, a batch job registration defining a batch job for execution on the computer system, and defining batch job parameters defining limits on the scheduling of the corresponding batch job,
- computing (820) a job schedule for executing the multiple batch jobs, computing the job schedule comprising
- generating (830) multiple candidate job schedules, a job schedule satisfying the defined limits, and
- predicting (840) a job schedule quality for candidate job schedule using a predictive model previously trained on job schedule performance data.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 800. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
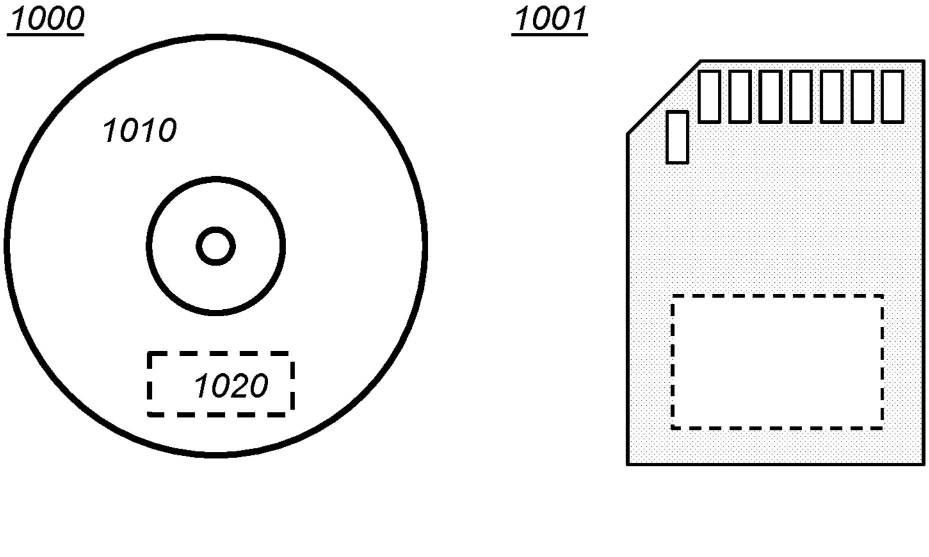

FIG. 7*a* shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a method of scheduling batch jobs, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of scheduling batch jobs.

Figure 7B:
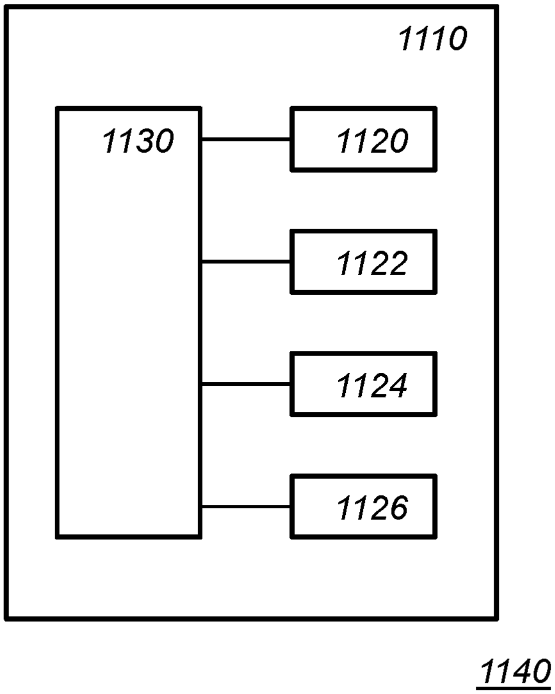

FIG. 7*b* shows in a schematic representation of a processor system 1140 according to an embodiment of a job scheduling system. The processor system comprises one or more integrated circuits 1110. The architecture of the one or more integrated circuits 1110 is schematically shown in FIG. 7*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors, or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the job scheduling device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

What is claimed is:

1. A computer-implemented method for scheduling batch jobs on a computer system, comprising:

receiving multiple batch job registrations from multiple client systems, a batch job registration defining a batch job for execution on the computer system, and defining batch job parameters defining limits on the scheduling of the corresponding batch job, wherein the multiple client systems comprise two or more tenants of a multi-tenant system, and a batch job comprises data synchronization jobs across multiple client systems;

computing a job schedule for executing the multiple batch jobs, wherein computing the job schedule comprises:

generating multiple candidate job schedules, a job schedule satisfying the defined limits, predicting a job schedule quality for a particular candidate job schedule, of the multiple candidate job schedules, using a predictive model previously trained on job schedule performance data, wherein the predicted job schedule quality for the particular candidate job schedule is based, at least in part, on a predicted availability of system components involved in processing of the particular job schedule, and selecting a job schedule from the multiple candidate job schedules based on the predicted job schedule qualities; and executing a job of the multiple batch jobs based on the selected candidate job schedule; and predicting a likelihood of a change in the client system at a given time, the job schedule quality of a job schedule being reducing for the data synchronization jobs scheduled with a lower likelihood of change.

2. A method as in claim 1, wherein the computer system is a cloud system, and the client systems connect to the computer system to register one or more batch jobs, the multiple batch jobs sharing the same computer hardware.

3. A method as in claim 1, wherein a job schedule quality comprises a predicted load for an involved system resource of the computer system, induced by the candidate job schedule, and/or a predicted availability of a system involved in the processing of the candidate job schedule.

4. A method as in claim 1, wherein the predictive model is configured to predict an individual induced load for the multiple batch jobs, job schedule quality comprises adding individual loads for a particular time induced by batch jobs scheduled to run at the particular time.

5. A method as in claim 4, wherein the predictive model first predicts an individual induced load for the multiple batch jobs, a job scheduler then approximating the job schedule.

6. A method as in claim 1, wherein a job scheduler generates multiple job schedules, which a quality is then predicted for.

7. A method as in claim 1, wherein the predictive model is configured to classify batch jobs into one of multiple categories with a different expected load.

8. A method as in claim 1, wherein the job parameters comprise one or more of a time Horizon, defining a start time range and/or end time range, and an execution guarantee indicating a minimal and/or maximum number of executions for a time period.

9. A method as in claim 1, comprising detecting a failed batch job execution, and rescheduling the batch job at a point in time with improved predicted availability and/or error rates compared to a threshold.

10. A computer-implemented method for training a predictive model comprising:

performing multiple iterations of:

receiving multiple batch job registrations from multiple client systems, a batch job registration defining a batch job for execution on the computer system, and defining batch job parameters defining limits on the scheduling of the corresponding batch job, wherein the multiple client systems comprise two or more tenants of a multi-tenant system, and a batch job comprises data synchronization jobs across multiple client systems;

computing a job schedule for executing the multiple batch jobs satisfying the defined limits based on a predicted job schedule quality for a particular candidate job schedule, wherein the predicted job schedule quality for the particular candidate job schedule is based, at least in part, on a predicted availability of system components involved in processing of the particular job schedule; and executing the job schedule while measuring the job schedule performance; predicting a likelihood of a change in the client system at a given time, the job schedule quality of a job schedule being reducing for the data synchronization jobs scheduled with a lower likelihood of change; and training the predictive model on the measured job schedule performance.

11. A method as in claim 10, wherein measuring the job schedule performance comprises measuring the individual performance of the multiple batch jobs in the job schedule, and at least one of the batch job registrations has a parameter defining a minimum number of executions of the batch job for a set time period, the method comprising increasing said minimum number of executions for the batch job thus obtaining additional individual measurements.

12. A method as in claim 10, wherein the job schedule quality comprises a predicted load for an involved system resource of the computer system, induced by the candidate job schedule, and/or a predicted availability of a system involved in the processing of the candidate job schedule.

13. A method as in claim 10, wherein the predictive model is configured to predict an individual induced load for the multiple batch jobs, job schedule quality comprises adding individual loads for a particular time induced by batch jobs scheduled to run at the particular time.

14. A method as in claim 13, wherein the predictive model first predicts an individual induced load for the multiple batch jobs, a job scheduler then approximating the job schedule.

15. A system for scheduling batch jobs on a computer system, comprising:

one or more processors; and one or more storage devices storing instructions that, when executed by the one or more processors, cause the one or more processors to perform operations to:

receive multiple batch job registrations from multiple client systems, a batch job registration defining a batch job for execution on the computer system, and defining batch job parameters defining limits on the scheduling of the corresponding batch job, wherein the multiple client systems comprise two or more tenants of a multi-tenant system, and a batch job comprises data synchronization jobs across multiple client systems;

compute a job schedule for executing the multiple batch jobs, the computing the job schedule comprising:

generate multiple candidate job schedules, a job schedule satisfying the defined limits; predict a job schedule quality for a particular candidate job schedule, of the multiple candidate job schedules, using a predictive model previously trained on job schedule quality data, wherein the predicted job schedule quality for the particular candidate job schedule is based, at least in part, on a predicted availability of system components involved in processing of the particular job schedule;

select a job schedule from the multiple candidate job schedules based on the predicted job schedule qualities; and execute a job of the multiple batch jobs based on the selected candidate job schedule; and predict a likelihood of a change in the client system at a given time, the job schedule quality of a job schedule being reducing for the data synchronization jobs scheduled with a lower likelihood of change.

16. A system as in claim 15, wherein at least one of the batch job registrations has a parameter defining a minimum number of executions of the batch job for a set time period, the method comprising increasing said minimum number of executions for the batch job thus obtaining additional individual measurements.

17. A system as in claim 15, wherein a job schedule quality comprises a predicted load for an involved system resource of the computer system, induced by the candidate job schedule, and/or a predicted availability of a system involved in the processing of the candidate job schedule.

18. A system as in claim 15, wherein the predictive model is configured to predict an individual induced load for the multiple batch jobs, job schedule quality comprises adding individual loads for a particular time induced by batch jobs scheduled to run at the particular time.

19. A system as in claim 18, wherein the predictive model first predicts an individual induced load for the multiple batch jobs, a job scheduler then approximating the job schedule.

20. A non-transitory computer-readable medium storing program code executable to cause a computer system to:

receive multiple batch job registrations from multiple client systems, a batch job registration defining a batch job for execution on the computer system, and defining batch job parameters defining limits on the scheduling of the corresponding batch job, wherein the multiple client systems comprise two or more tenants of a multi-tenant system, and a batch job comprises data synchronization jobs across multiple client systems;

compute a job schedule for executing the multiple batch jobs, the computing the job schedule comprising:

generate multiple candidate job schedules, a job schedule satisfying the defined limits; predict a job schedule quality for a particular candidate job schedule, of the multiple candidate job schedules, using a predictive model previously trained on job schedule quality data, wherein the predicted job schedule quality for the particular candidate job schedule is based, at least in part, on a predicted availability of system components involved in processing of the particular job schedule;

select a job schedule from the multiple candidate job schedules based on the predicted job schedule qualities; and execute a job of the multiple batch jobs based on the selected candidate job schedule; and predict a likelihood of a change in the client system at a given time, the job schedule quality of a job schedule being reducing for the data synchronization jobs scheduled with a lower likelihood of change.

21. A medium as in claim 20, wherein at least one of the batch job registrations has a parameter defining a minimum number of executions of the batch job for a set time period, the method comprising increasing said minimum number of executions for the batch job thus obtaining additional individual measurements.

22. A medium as in claim 20, wherein a job schedule quality comprises a predicted load for an involved system resource of the computer system, induced by the candidate job schedule, and/or a predicted availability of a system involved in the processing of the candidate job schedule.

23. A medium as in claim 20, wherein the predictive model is configured to predict an individual induced load for the multiple batch jobs, job schedule quality comprises adding individual loads for a particular time induced by batch jobs scheduled to run at the particular time.

24. A medium as in claim 23, wherein the predictive model first predicts an individual induced load for the multiple batch jobs, a job scheduler then approximating the job schedule.

* * * * *